Patented Nov. 16, 1926.

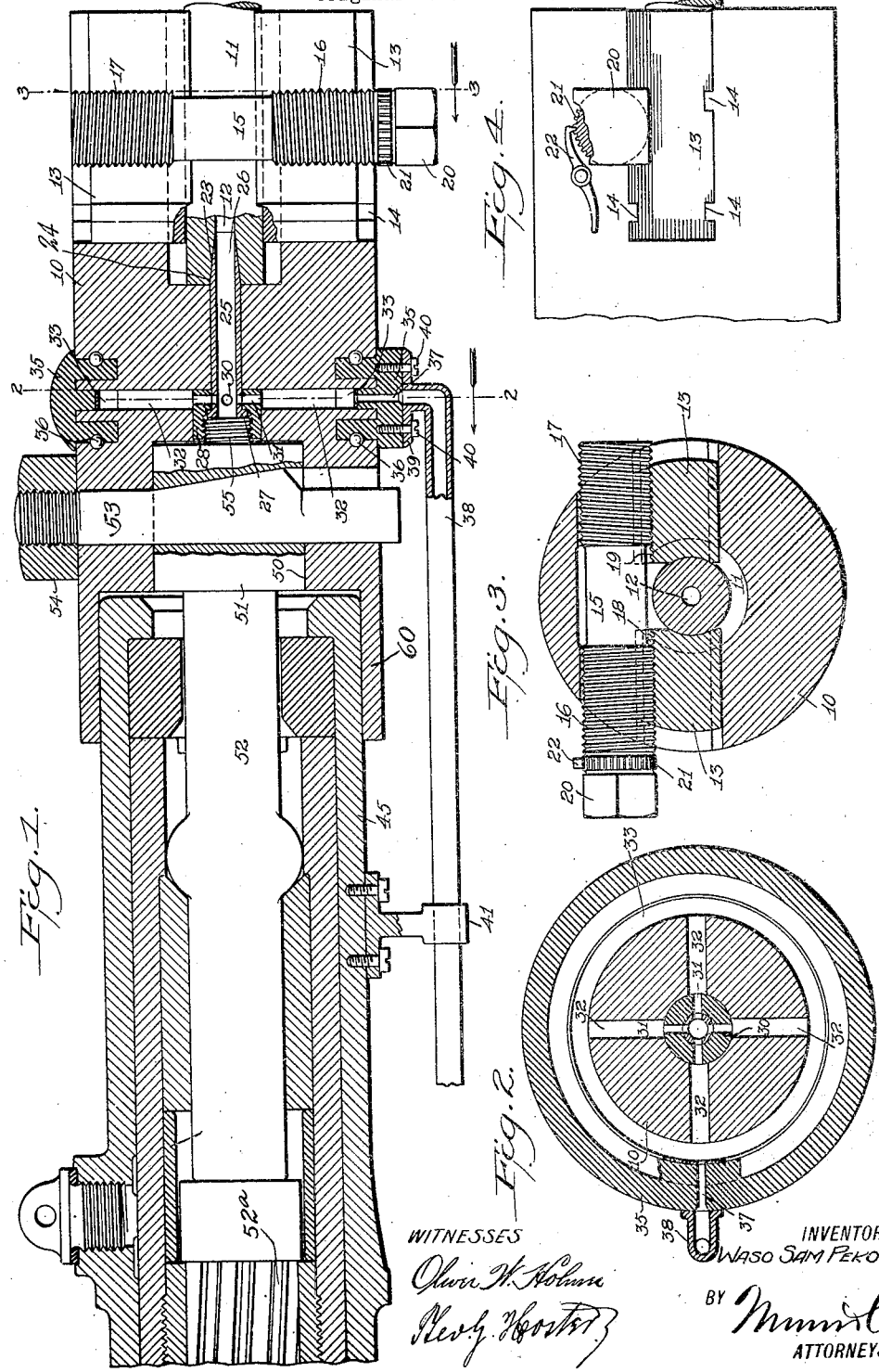

1,607,559

UNITED STATES PATENT OFFICE.

WASO SAM PEKOVICH, OF JUNEAU, TERRITORY OF ALASKA.

WATER ATTACHMENT FOR POWER DRILLS.

Application filed February 4, 1921, Serial No. 442,473. Renewed September 1, 1926.

The invention relates to fluid-operated percussive drills, and its object is to provide a new and improved water attachment for such drills arranged to supply water to the drilling tool in the bore hole without passing the water through the actuating members made hollow for the purpose, as now generally constructed, thus permitting of making the working members solid and rendering the same more durable and effective.

Another object is to permit of replacing worn out working parts by new ones without affecting the water attachment.

With these and other objects in view, the invention consists of certain novel features of construction, as hereinafter shown and described and then specifically pointed out in the claim.

A practical embodiment of the invention is represented in the accompanying drawings forming a part of this specification, in which similar characters of reference indicate corresponding parts in all the views.

Figure 1 is a longitudinal central section of the improved water attachment as applied to a power drill;

Figure 2 is a cross section of the same on the line 2—2 of Figure 1;

Figure 3 is a similar view of the same on the line 3—3 of Figure 1; and

Figure 4 is a side elevation, partly in section, of the locking device for holding the jaw-controlling screw rod against accidental turning.

The improved water attachment for power drills is applied to a chuck or holder 10 for holding the drilling tool 11 provided with the usual central water passage 12 for supplying water to the drill hole. The drilling tool 11 is held in position in the chuck 10 by jaws 13 mounted to slide diametrically in guideways 14 arranged on the chuck 10, and the said jaws 13 clampingly engage the opposite sides of the drilling tool 11. The jaws 13 are moved toward and from the drilling tool by the use of a screw rod 15 having right and left hand screw threads 16 and 17 engaging corresponding segmental nuts 18 and 19 formed on the jaws 13. The outer end of the screw rod 15 is provided with a head 20 for the application of a wrench or other tool to turn the screw rod with a view to move the jaws 13 towards or from the drilling tool 11 according to the direction in which the screw rod is turned.

The screw rod 15 is also provided adjacent the head 20 with a toothed portion 21 engaged by a pawl 22 pivoted on the chuck 10 (see Figure 4), and serving to hold the screw rod against accidental turning.

Into the tapering end 23 of the water passage 12 in the drilling tool 11 extends the correspondingly tapered end 24 of a tube 25 for directing water into the passage 12. The tube 25 is provided with a flange 27 seated in a tube holder 28 held centrally in the chuck 10. The tube 25 is provided with apertures 30 in register with openings 31 formed in the tube holder 28 and opening into radial passages 32 formed in the chuck 10. The passages 32 lead to an annular chamber 33 formed in the chuck 10 and closed by a collar 35 mounted to rotate on the chuck 10 preferably by the use of a ball bearing 36, as plainly shown in Figure 1. The collar 35 is provided with an opening 37 connected with a water supply pipe 38 having a flange 39 fastened by screws or other fastening devices 40 to the collar 35. The water supply pipe 38 extends through a guide 41 fastened to the machine head 45 thus holding the collar 35 against rotation while the chuck 10 is intermittently rotated in the usual manner. The water supply pipe 38 is connected with a suitable water supply whereby water under pressure passes through the pipe 38 and opening 37 into the annular water chamber 33 from which the water passes by way of the passages 32, the openings 31 and apertures 30 into the tube 25 from which the water is directed into the water passage 12 to pass into the drill hole at the cutting edges of the drill tool 11.

It will be noticed that by the arrangement described water is continually supplied to the drilling tool wholly independently of the actuating parts of the power drill and without providing such parts with water passages and weakening the same as heretofore practiced.

The described chuck and its appurtenances including the shank 52 constitute when in place an attachment forming an addition and an extension of the usual drill at the front beyond the nose thereof. At the rear end of the attachment the same is formed with a socket, 60, to telescope over the front end or nose of the drilling machine head 45 and it will be seen that when the attachment is thus in place with the socket 60 slipped on to the head 45, the front end of said head is effectively closed against the entrance of chips or other particles when the drill is working overhead. In the usual drill, particles enter the front end of the head and find their way past the drill bit to the hammer, the hammer actuating means and other working parts, requiring that the drill be frequently taken apart and cleaned—sometimes as often as twice a day—in doing overhead drilling. This is obviated by my attachment which prevents the entrance of any particles through the front end of the drill head 45.

Moreover, in the ordinary drill with the water attachment in the rear of the drill bit and entering the usual head (45) either directly adjacent the front end of the hammer or at the extreme rear end of the drill body, leakage is liable to occur at some point within the drill, the leakage water backing up within the drill causing the drill to lose its efficiency and to deteriorate. The leakage of water into the drill is prevented by my attachment which supplies the water to the extension and in a plane remote from the front end of the drill head.

The chuck 10 is provided with a recess 50 into which projects a head 51 formed on a shank 52 receiving blows from the hammer 52ª. The head 51 is engaged by a key bolt 53 attached to the chuck 10 by a nut 54 to fasten the shank 52 to the said chuck. On removing the bolt 53 the shank 52 can be readily disconnected from the chuck 10, and in case the shank is worn out it can be replaced by a new one without requiring renewal of the chuck 10 and the parts mounted thereon. The head 51 of the shank 52 is provided with a reduced threaded portion 55 screwing into the tube holder 28 to hold the latter in place in the chuck 10 and to fasten the tube 25 in place in its tube holder 28. The mounting of the shank 52 in the body 45 is of usual construction and hence further description of the same is not deemed necessary.

Having thus described my invention, I claim as new and desire to secure by Letters Patent:

In combination with the cylinder of a drilling machine, a tool carrying member having water passages therein, means for detachably securing said member to the outer end of the cylinder, means for rotating said member, means upon the outside of the cylinder and associated with the tool carrying member to supply water to said passages and an annular flange extending axially from said member over the adjacent end of the cylinder to provide a protector.

WASO SAM PEKOVICH.